United States Patent
Abraham et al.

(10) Patent No.: US 12,440,310 B2
(45) Date of Patent: Oct. 14, 2025

(54) METHOD FOR SIMULATING DENTAL IMAGES THAT INCLUDE TOOTH ROOTS

(71) Applicant: Orca Dental AI Ltd., Herzeliya (IL)

(72) Inventors: Daniel Abraham, Raanana (IL); Chen Porat, Kiryat Tivon (IL)

( * ) Notice: Subject to any disclaimer, the term of this patent is extended or adjusted under 35 U.S.C. 154(b) by 390 days.

(21) Appl. No.: 18/056,817

(22) Filed: Nov. 18, 2022

(65) Prior Publication Data

US 2023/0149128 A1 May 18, 2023

Related U.S. Application Data

(60) Provisional application No. 63/280,702, filed on Nov. 18, 2021, provisional application No. 63/280,706, filed on Nov. 18, 2021.

(51) Int. Cl.
*A61C 7/00* (2006.01)
*G06T 7/10* (2017.01)
*G06T 7/70* (2017.01)

(52) U.S. Cl.
CPC ............. *A61C 7/002* (2013.01); *G06T 7/10* (2017.01); *G06T 7/70* (2017.01); *G06T 2207/10081* (2013.01); *G06T 2207/10116* (2013.01); *G06T 2207/30036* (2013.01)

(58) Field of Classification Search
CPC .. A61C 7/002; G06T 7/10; G06T 7/70; G06T 2207/10081; G06T 2207/10116; G06T 2207/30036
See application file for complete search history.

(56) References Cited

U.S. PATENT DOCUMENTS

| 8,977,339 | B1 | 3/2015 | Wu et al. |
| 10,010,299 | B2 * | 7/2018 | Tsuji ........................ A61B 6/51 |
| 10,049,457 | B2 | 8/2018 | Abraham et al. |
| 10,460,839 | B1 | 10/2019 | Ricci |

(Continued)

FOREIGN PATENT DOCUMENTS

| JP | 2017143873 A | 8/2017 |
| WO | 2008150840 A1 | 12/2008 |

(Continued)

OTHER PUBLICATIONS

International Search Report for PCT Application No. PCT/IB2022/000695, dated Mar. 14, 2023.

(Continued)

*Primary Examiner* — Shefali D Goradia

(57) ABSTRACT

A computer-implemented method for monitoring teeth position during treatment includes segmenting three-dimensional dental X-ray image data of teeth in a first treatment state and segmenting optical-scan (OS) image data of the teeth in a second treatment state. The position and orientation of each segmented X-ray crown is compared with the position and orientation of each segmented OS crown to determine any relative position differences and any relative orientation differences. Each segmented X-ray root is repositioned and/or reoriented according to the relative position differences and/or any relative orientation differences, if any, between the corresponding segmented OS and X-ray crowns. The OS crown and the X-ray root are then fused so simulate the roots in the second treatment state without exposing the patient to additional radiation.

8 Claims, 17 Drawing Sheets

(56) References Cited

U.S. PATENT DOCUMENTS

| | | | |
|---|---|---|---|
| 2008/0172386 A1 | 7/2008 | Ammar et al. | |
| 2009/0003667 A1 | 1/2009 | Cheng et al. | |
| 2013/0209961 A1 | 8/2013 | Rubbert et al. | |
| 2015/0186748 A1 | 7/2015 | Cootes et al. | |
| 2016/0038092 A1 | 2/2016 | Golay | |
| 2016/0063720 A1 | 3/2016 | Han et al. | |
| 2016/0183866 A1* | 6/2016 | Tsuji | A61B 6/51 433/29 |
| 2016/0203604 A1 | 7/2016 | Gupta et al. | |
| 2019/0148005 A1* | 5/2019 | Domracheva | G06F 18/214 345/424 |
| 2019/0328489 A1 | 10/2019 | Capron-Richard et al. | |
| 2020/0175678 A1 | 6/2020 | Abraham et al. | |
| 2020/0320685 A1* | 10/2020 | Anssari Moin | G06N 3/08 |
| 2021/0153976 A1* | 5/2021 | Chen | A61C 9/0053 |

FOREIGN PATENT DOCUMENTS

| | | | | |
|---|---|---|---|---|
| WO | 2016032397 A1 | | 3/2016 | |
| WO | 2020141366 A1 | | 7/2020 | |
| WO | WO-2021215582 A1 | * | 10/2021 | |
| WO | WO-2022011342 A1 | * | 1/2022 | A61B 5/4547 |

OTHER PUBLICATIONS

Miki et al. "Tooth Labeling in Cone-Beam CT Using Deep Convolutional Neural Network for Forensic Identification." SPIE Medical Imaging, Mar. 3, 2017, 7 pages.

L. Wolf et al., "Automatic Cephalometric Evaluation of Patients Suffering from Sleep-Disordered Breathing", Tel Aviv University, www.cs.tau.ac.il/~wolf/papers/ceph.pdf.

C. Lindner et al., "Fully automatic cephalometric evaluation using Random Forest regression-voting", p. 1-8, University of Manchester, http://personalpages.manchester.ac.uk/staff/claudia.lindner/_publications/lindner_isbi2015.pdf.

C. Lindner et al., "Robust and Accurate Shape Model Matching using Random Forest Regression-Voting", IEEE Transactions on Pattern Analysis and Machine Intelligence, Sep. 2015, p. 1862-74, 37(9), IEEE.

C. Lindner et al., "Fully Automatic Segmentation of the Proximal Femur Using Random Forest Regression Voting", IEEE Transactions on Medical Imaging, 2013, p. 1-11, IEEE, http://personalpages.manchester.ac.uk/staff/claudia.lindner/_publications/lindner_tmi2013.pdf.

Wikipedia, "Deep Learning—Wikipedia", https://en.wikipedia.org/wiki/Deep_learning.

Leonardi et al., "An Evaluation of Cellular Neural Networks for the Automatic Identification of Cephalometric Landmarks on Digital Images", Journal of Biomedicine and Biotechnology, vol. 2009, Article ID 717102, 2009, 12 pages.

El-Feghi et al., "Automatic localization of craniofacial landmarks using multi-layer perceptron as a function approximator", Pattern Recognition Letters, vol. 27, 2006, pp. 544-550.

Pei et al., "Anatomical Structure Sketcher for Cephalograms by Bimodal Deep Learning", Proc. British Machine Vision Conference 2013, 12 pages.

* cited by examiner

METHOD FOR SIMULATING DENTAL IMAGES THAT INCLUDE TOOTH ROOTS

CROSS-REFERENCE TO RELATED APPLICATIONS

This application claims priority to U.S. Provisional Application No. 63/280,702, titled "Method and System for Simulating Full Dental Images Using Base X-Ray Images," filed on Nov. 18, 2021, and to U.S. Provisional Application No. 63/280,706, titled "Method and System for Simulating Full Dental Images Using Machine Learning," filed on Nov. 18, 2021, which are hereby incorporated by reference.

TECHNICAL FIELD

This application relates generally to dental imaging and dental image processing.

BACKGROUND

Cone-beam computer tomography (CBCT) scans are used to generate three-dimensional (3D) images of a patient's dentition (e.g., teeth), such as for orthodontic or endodontic treatment. In CBCT scanning, a special X-ray machine connected to a computer processor and control system rotates a conical beam source and a detector about the subject's head to generate data corresponding to multiple images from different planes or slices through the subject. The images are reconstructed to form a three-dimensional image, which can be segmented to improve visualization.

Though it would be clinically useful to take multiple CBCT scans of the patient's dentition over the course of orthodontic treatment, this is generally not done to limit radiation exposure and to reduce treatment costs.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a computer-implemented method for monitoring teeth position during treatment, comprising: (a) segmenting three-dimensional dental X-ray image data of teeth in a first treatment state to produce segmented X-ray crowns and segmented X-ray roots, each segmented X-ray crown associated with a respective segmented X-ray root; (b) segmenting optical-scan (OS) image data of the teeth in a second treatment state to produce segmented OS crowns; (c) comparing, for each tooth, a position and an orientation of each segmented X-ray crown with a position and an orientation of a respective segmented OS crown; (d) determining, for each tooth, any relative position differences and any relative orientation differences of each segmented X-ray crown relative to the respective segmented OS crown; (e) for each tooth in which a relative position difference and/or a relative orientation difference of a corresponding segmented X-ray crown is determined in step (d), changing a position and/or an orientation of the respective segmented X-ray root according to the relative position difference and/or the relative orientation difference of the corresponding segmented X-ray crown; and (f) for each tooth in which the corresponding segmented X-ray crown has the same relative position and the same relative orientation relative to the respective segmented OS crown, maintaining the position and the orientation of the respective segmented X-ray root; and (g) after steps (e) and (f), fusing, for each tooth, each segmented OS crown with a corresponding segmented X-ray root to form hybrid image data that simulates the roots of the teeth in the second treatment state.

In one or more embodiments, the three-dimensional dental X-ray image data comprise cone-beam computer tomography data. In one or more embodiments, the OS segmented crowns are second segmented OS crowns, the OS image data are first OS image data, the hybrid image data are second hybrid image data, and the method further comprises: (h) segmenting first OS image data of the dentition in the first treatment state to produce first segmented OS crowns; (i) registering, for each tooth, each segmented X-ray crown with a respective first segmented OS crown; and (j) after step (i), fusing each first segmented OS crown with the corresponding segmented X-ray root to form first hybrid image data that simulates the roots of the teeth in the first treatment state.

In one or more embodiments, the OS image data comprise intra-oral scan image data. In one or more embodiments, the OS image data represent an optical scan of a mechanical mold of the dentition. In one or more embodiments, the method further comprises graphically indicating each difference determined in step (d). In one or more embodiments, the method further comprises displaying, on a display screen coupled to the computer, fused teeth using the hybrid image data.

Another aspect of the invention is directed to a computer-implemented method for approximating dental root images, comprising: (a) segmenting optical-scan (OS) image data of teeth of a patient to produce segmented OS crowns; (b) comparing, for each tooth of the patient, each segmented OS crown to segmented three-dimensional (3D) X-ray crowns from teeth of other people, each segmented 3D X-ray crown associated with a corresponding segmented 3D X-ray root; (c) determining, for each tooth of the patient, a closest match between each segmented OS crown and the 3D X-ray crowns to produce closest-match 3D X-ray crowns, each closest-match 3D X-ray crown associated with a corresponding closest-match 3D X-ray root; and (d) fusing, for each tooth of the patient, each segmented OS crown with the corresponding closest-match 3D X-ray root to form hybrid image data that approximates the roots of the teeth of the patient.

In one or more embodiments, the method further comprises segmenting two-dimensional (2D) X-ray dental image data of one or more teeth of the patient to produce one or more segmented 2D X-ray crowns; comparing, for each tooth of the patient, any corresponding segmented 2D X-ray crowns to the segmented 3D X-ray crowns; and determining, for each tooth of the patient, a closest match between (a) each segmented OS crown and any corresponding segmented 2D X-ray crowns and (b) the 3D X-ray crowns to produce the closest-match 3D X-ray crowns.

In one or more embodiments, the 2D X-ray image data comprise panoramic X-ray image data, bitewing X-ray image data, and/or periapical X-ray image data.

In one or more embodiments, the method further comprises displaying, on a display screen coupled to the computer, fused teeth using the hybrid image data. In one or more embodiments, the segmented 3D X-ray crowns comprise segmented cone-beam computer tomography crowns. In one or more embodiments, the OS image data comprise intra-oral scan image data. In one or more embodiments, the OS image data represent an optical scan of a mechanical mold of at least some of the teeth of the patient.

Another aspect of the invention is directed to a computer-implemented method for approximating dental root images, comprising: (a) segmenting optical-scan (OS) image data of teeth of a patient to produce segmented OS crowns; (b) segmenting two-dimensional (2D) X-ray dental image data of the teeth to produce segmented 2D X-ray roots; (c) comparing, for each tooth of the patient, each segmented OS crown to segmented three-dimensional (3D) X-ray crowns from teeth of other people, each segmented 3D X-ray crown associated with a corresponding segmented 3D X-ray root; (d) determining, for each tooth of the patient, candidate matches between each segmented OS crown and the 3D X-ray crowns to produce candidate 3D X-ray crowns, each candidate 3D X-ray crown associated with a corresponding candidate 3D X-ray root; (e) comparing, for each tooth of the patient, candidate 3D X-ray roots and one or more segmented 2D X-ray roots, the candidate 3D X-ray roots and the segmented 2D X-ray root(s) for the same tooth; (f) determining, for each tooth of the patient, a closest match between the candidate 3D X-ray roots and the segmented 2D X-ray root(s) to produce a closest-match 3D X-ray root; and (g) fusing, for each tooth of the patient, each segmented OS crown with a corresponding closest-match 3D X-ray root to form hybrid image data that approximates the roots of the teeth of the patient.

In one or more embodiments, the 2D X-ray dental image data comprise panoramic X-ray image data, bitewing X-ray image data, and/or periapical X-ray image data. In one or more embodiments, the method further comprises displaying, on a display screen coupled to the computer, fused teeth using the hybrid image data. In one or more embodiments, the segmented 3D X-ray crowns comprise segmented cone-beam computer tomography (CBCT) crowns, and the corresponding candidate 3D X-ray roots comprise segmented CBCT roots. In one or more embodiments, the OS image data comprise intra-oral scan image data. In one or more embodiments, the OS image data represent an optical scan of a mechanical mold of at least some of the teeth of the patient.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

A patient's teeth or dentition is imaged multiple times during orthodontic, endodontic, or other dental treatment. At a first treatment state of the patient's teeth, the patient's dentition is imaged by taking a three-dimensional (3D) X-ray (e.g., CBCT) scan and an optical scan (OS). The 3D X-ray scan generates a full image of the root and crown of each tooth. The OS can include an intra-oral scan (IOS) of the patient's mouth to generate an image of the crown of each tooth as visible in the patient's mouth. Additionally, the OS can include optical scans of mechanical molds (e.g., denture models) taken from the patient's mouth, which can provide the contours of the intra-oral volume of the patient's dentition. Alternatively, a CBCT scan of the mechanical mold can be taken, and then converted into an STL file which can be used as an OS. Another option would be to take several 2D images of the oral cavity with a smart phone or an intra-oral camera, and then create a 3D STL image of the oral cavity. Since OS images are typically higher resolution than CBCT images, the OS and CBCT images can be meshed or fused to form a hybrid image that includes the higher-resolution crown images from the first OS and the lower-resolution root images from the CBCT scan.

At a second treatment state of the patient's teeth, a second OS is taken to image the crown of each tooth. Some of the patient's teeth may have moved (e.g., translated, pivoted, and/or rotated) from the first treatment state to the second treatment state, which can be determined by comparing the crown images from the second OS with the crown images from the first OS or from the 3D X-ray scan. For each tooth in which the position and/or orientation of the crown has changed between the first and second treatment states, the root images are also moved and/or reoriented to generate the simulated hybrid image.

A simulated hybrid image is generated using the crown images from the second OS (taken in the second treatment state) and the root images from the CBCT scan (taken in the first treatment state). This allows the provider to view images of the roots without having to perform additional 3D X-ray scans, which expose the patient to additional radiation and increase treatment costs.

In another aspect, a patient's teeth or dentition is imaged by taking an OS of the teeth. The crowns in the OS are segmented to form segmented OS crowns. Each segmented OS crown is compared to segmented 3D X-ray crowns of other patients to determine the best match. Each segmented OS crown is fused with the segmented 3D X-ray root associated with the 3D X-ray crown having the best match. The fused teeth represent include approximate or simulated tooth roots without having to perform a 3D X-ray scan, which exposes the patient to additional radiation and increases treatment costs.

Figure 1:
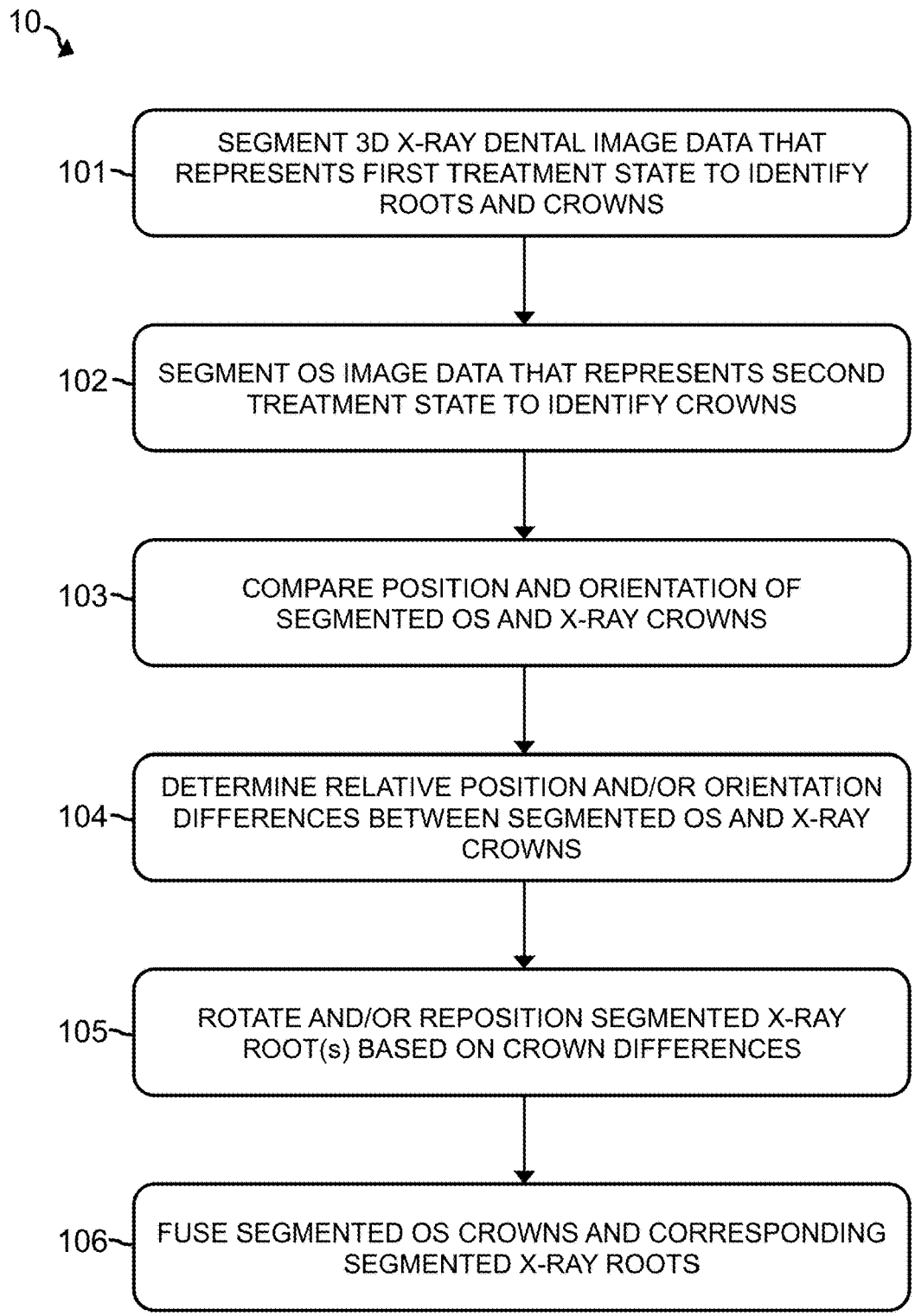
FIG. 1 is a flow chart of a computer-implemented method for monitoring teeth position during treatment, according to an embodiment

FIG. 1 is a flow chart of a computer-implemented method 10 for monitoring teeth position during treatment, according to an embodiment.

In step 101, the computer segments 3D X-ray dental image data that represents a first treatment state of a patient. The 3D X-ray dental image data can be or can include CBCT dental image data from a CBCT dental scan. The 3D X-ray dental image data represents the crowns and roots of some or all of the patient's teeth or dentition. The first treatment state can represent the patient's teeth or dentition prior to dental treatment, such as orthodontic or another treatment. In another example, the first treatment state can represent the patient's teeth or dentition on a first date and/or time, which can be prior to or during dental treatment. For example, the first treatment state can represent the patient's dentition following a dental injury.

Figure 2:
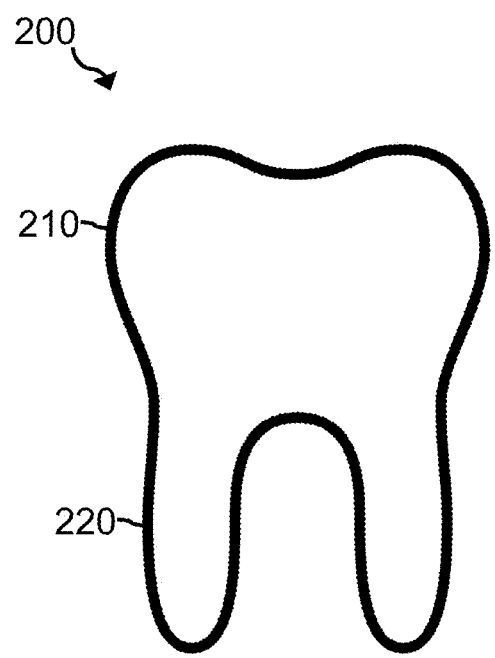
FIG. 2 is a simplified example of a 3D X-ray dental image of a tooth according to an embodiment.
Figure 3A:
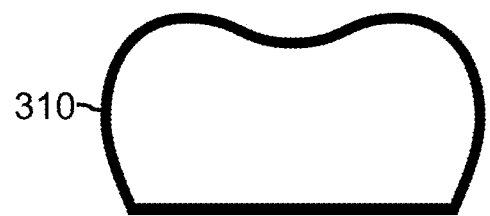
FIGS. 3A and 3B are simplified examples of a segmented 3D X-ray crown and a segmented 3D X-ray root, respectively.
Figure 3B:
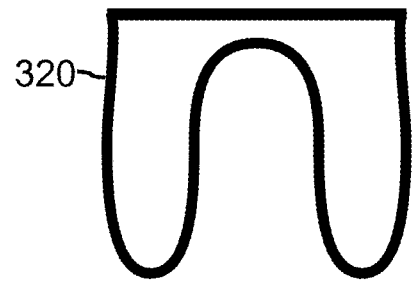

The 3D X-ray dental image data can be segmented using machine learning and/or convolutional neural networks (CNNs), for example as disclosed in U.S. Patent Application Publication No. 2020/0175678, titled "Dental Image Segmentation and Registration With Machine Learning," which is hereby incorporated by reference. A simplified example of a 3D X-ray dental image of a tooth 200 including a crown 210 and root 220 from the CBCT dental image data is illustrated in FIG. 2. A simplified example of a segmented X-ray crown 310 and a segmented X-ray root 320 is illustrated in FIGS. 3A and 3B, respectively.

The computer can receive the 3D X-ray dental image data from computer memory that is accessible to the computer. Additionally or alternatively, the computer can receive the 3D X-ray dental image data from a 3D X-ray machine such as a CBCT scanner.

In some embodiments, the computer can segment OS dental image data that represents the first treatment state of the patient to extract segmented OS crowns in addition to or instead of extracting segmented 3D X-ray crowns.

In step 102, the computer segments OS dental image data that represents a second treatment state of the patient. The second treatment state occurs later temporally than the first treatment state. For example, the second treatment state can occur after a first wire for braces or a first aligner in an align system (e.g., Invisalign®) has been used on the patient for a given time period, such as for 2-4 weeks or another time period. In another example, the second treatment state can occur after a root canal procedure, a dental crown procedure, or another dental procedure. In another example, the second treatment state can occur after a period of time has elapsed since the first treatment state and the optical scan was taken to track the patient's teeth.

Figure 4:
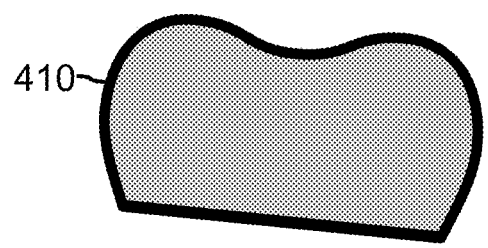
FIG. 4 is a simplified example of a segmented crown from the OS dental image data.

The computer segments the OS dental image data to identify and/or extract the crowns in the patient's teeth or dentition (or as viewable in the OS dental image data). The OS dental image data can be segmented using machine learning and/or CNNs, for example as disclosed in U.S. Patent Application Publication No. 2020/0175678. A simplified example of a segmented crown 410 from the OS dental image data is illustrated in FIG. 4.

The computer can receive the OS dental image data from computer memory that is accessible to the computer. Additionally or alternatively, the computer can receive the OS dental image data from a dental optical scanner such as an intra-oral scanner or from an optical scan of a mold, physical model, or impression of one or more teeth, which can be scanned on a benchtop, in a lab, or with another machine or in another facility.

In step 103, the computer compares the segmented X-ray crown and the corresponding/respective segmented OS crown for each tooth. The computer can compare the position of the segmented X-ray crown and the position of the corresponding/respective OS crown for each tooth. Additionally or alternatively, the computer can compare the orientation of the segmented X-ray crown and the orientation of the corresponding/respective OS crown for each tooth. The orientation can include angle, pivot, and/or rotation (e.g., with respect to one or more axes).

For example, one or more teeth may have shifted in position and/or orientation (e.g., by pivoting and/or rotating) during the treatment time period between the first and second treatment states.

In step 104, the computer determines, for each tooth, any differences in the relative position and the relative orientation of the segmented crowns in the first and second treatment states. The differences in position and/or orientation can be measured using the known scales of the images (e.g., image data), which are preferably the same scale. The computer can perform steps 103 and/or 104 using machine learning and/or CNNs. For example, a CNN can receive as an input the segmented X-ray crown and the corresponding/respective segmented OS crown for each tooth and can output a transformation matrix that indicates how to re-position and/or re-orient the segmented X-ray crown (the first treatment state) to match the position and/or orientation of the corresponding/respective segmented OS crown (the second treatment state) for each tooth.

Figure 5:
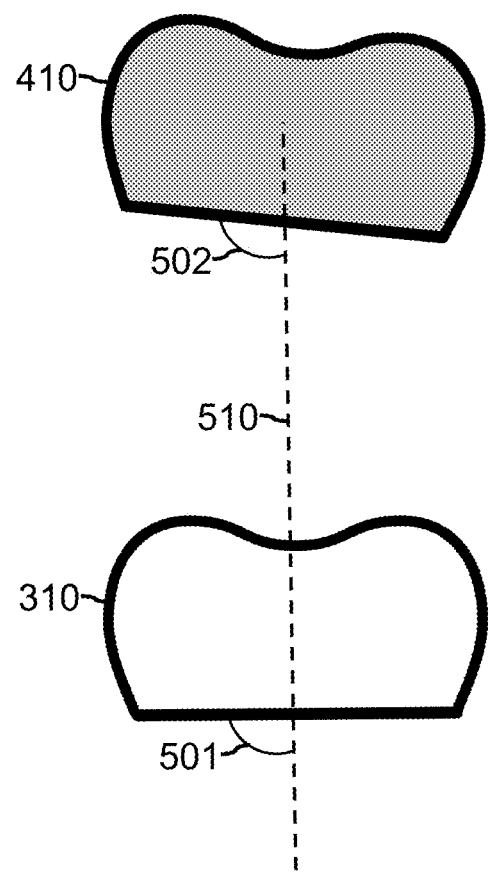
FIG. 5 illustrates an example of a relative orientation difference between segmented crown images of the same tooth in the first and second treatment states.

FIG. 5 illustrates an example of a relative orientation difference between segmented crown images of the same tooth in the first and second treatment states. The segmented X-ray crown 310, in the first treatment state, is oriented at a first angle 501 with respect to axis 510. The segmented OS crown 410, in the second treatment state, is oriented at a second angle 502 with respect to axis 510. The second angle 502 is different (e.g., larger) than the first angle 501, indicating an orientation difference. The difference in the first and second angles 501, 502 indicates that the segmented OS crown 410 is pivoted clockwise with respect to axis 510 compared to the segmented X-ray crown 310.

In step 105, for each tooth in which a difference in the relative orientation and/or the relative position of the segmented crown is determined between the first and second treatment states in step 104, the computer makes a corresponding change in the position and/or orientation of the corresponding segmented X-ray root from the 3D X-ray dental image data in the first treatment state. For example, if the segmented OS crown, in the second treatment state, is pivoted or rotated by 2 degrees with respect to an axis in a given plane compared to the segmented X-ray crown, in the first treatment state, of the same tooth, the computer rotates or pivots the corresponding segmented X-ray root (of the same tooth) by 2 degrees with respect to the same axis in the same plane (or with respect to a parallel axis in a parallel plane). Likewise, if a segmented OS crown, in the second treatment state, is moved laterally by 1 mm with respect to an axis compared to the segmented X-ray crown of the same tooth, in the first treatment state, the corresponding X-ray root of the same tooth will also be moved laterally by 1 mm with respect to the same or a parallel axis. The segmented X-ray root can be re-positioned and/or re-oriented using machine learning and/or CNNs.

Alternatively, the computer can register and/or align each segmented crown in the 3D dental image data with the respective crown in the OS dental image data. Aligning and/or registering the segmented crowns can cause the segmented roots in the 3D dental image data to be aligned with the segmented crowns in the OS dental image data. The segmented crowns in the 3D dental image data and in the OS dental image data can be registered and/or aligned using machine learning and/or CNNs.

For each tooth in which the difference in the relative position and the relative orientation of the segmented X-ray crown and the respective segmented OS crown is zero, as determined in step 104, the position and orientation of the corresponding segmented X-ray root are maintained in step 105. For example, when the position and orientation of the segmented X-ray crown is the same as the position and orientation of the corresponding/respective segmented OS crown, the position and orientation of the corresponding segmented X-ray root is not changed in step 105.

Figure 6:
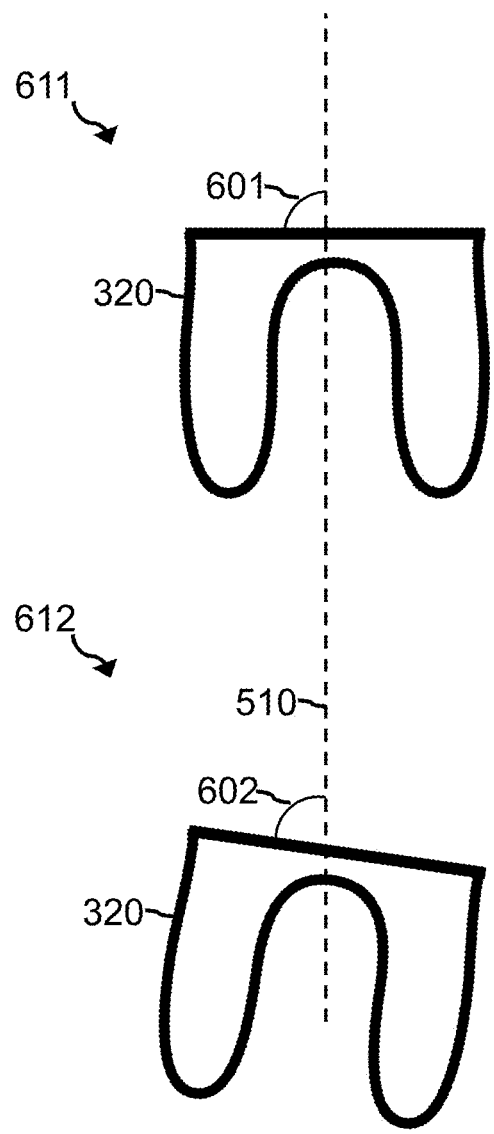
FIG. 6 illustrates an example of changing an orientation of a segmented 3D X-ray root according to the relative orientation difference determined between the segmented crowns in the first and second treatment states.

FIG. 6 illustrates an example of changing an orientation of a segmented 3D X-ray root according to the relative orientation difference determined between the segmented crowns in the first and second treatment states. In the first treatment state 611, the 3D X-ray root 320 is oriented at a first angle 601 with respect to axis 510. In a simulated second treatment state 612, the 3D X-ray root 320 is pivoted clockwise with respect to axis 510 such that the 3D X-ray root 320 is oriented at a second angle 602 with respect to axis 510. The difference between the first and second angles 601, 602 is equal to the difference between the first and second angles 501, 502.

In step 106, the computer fuses, combines, and/or meshes the segmented OS crowns and the segmented X-ray roots for corresponding teeth to form fused teeth with hybrid dental image data. Any segmented 3D X-ray roots that were re-positioned and/or re-oriented in step 105 are fused in the re-positioned and/or re-oriented state. The fused teeth can simulate the position and orientation of the roots in the patients' dentition over the course of treatment (e.g., over time) without having to expose the patient to additional radiation and without incurring the expense of additional 3D X-ray (e.g., CBCT) scans. This is a significant technical advantage over existing treatment methods that rely on performing 3D X-rays scans throughout treatment. The segmented OS crowns and the segmented X-ray roots can be fused using machine learning and/or CNNs.

The fused teeth can be displayed on a display screen coupled to the computer.

Figure 7:
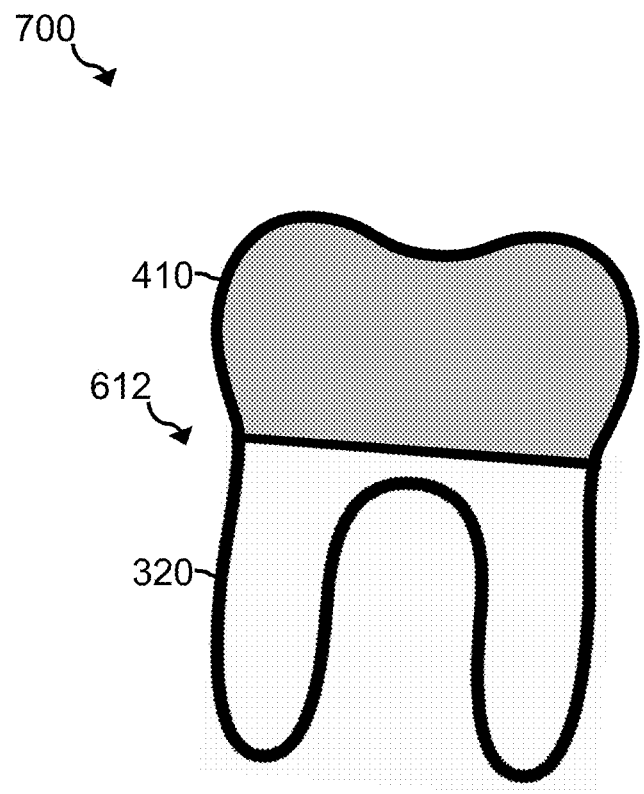
FIG. 7 is a simplified example of a fused tooth according to an embodiment.

FIG. 7 illustrates an example of a fused tooth 700 according to an embodiment. The fused tooth includes the segmented X-ray root 320, from the 3D X-ray image data, in the simulated second treatment state 612, and the segmented OS crown 410, from the OS image data, in the second treatment state. The segmented X-ray root 320 simulates the position and orientation of the root in the second treatment state.

Figure 8:
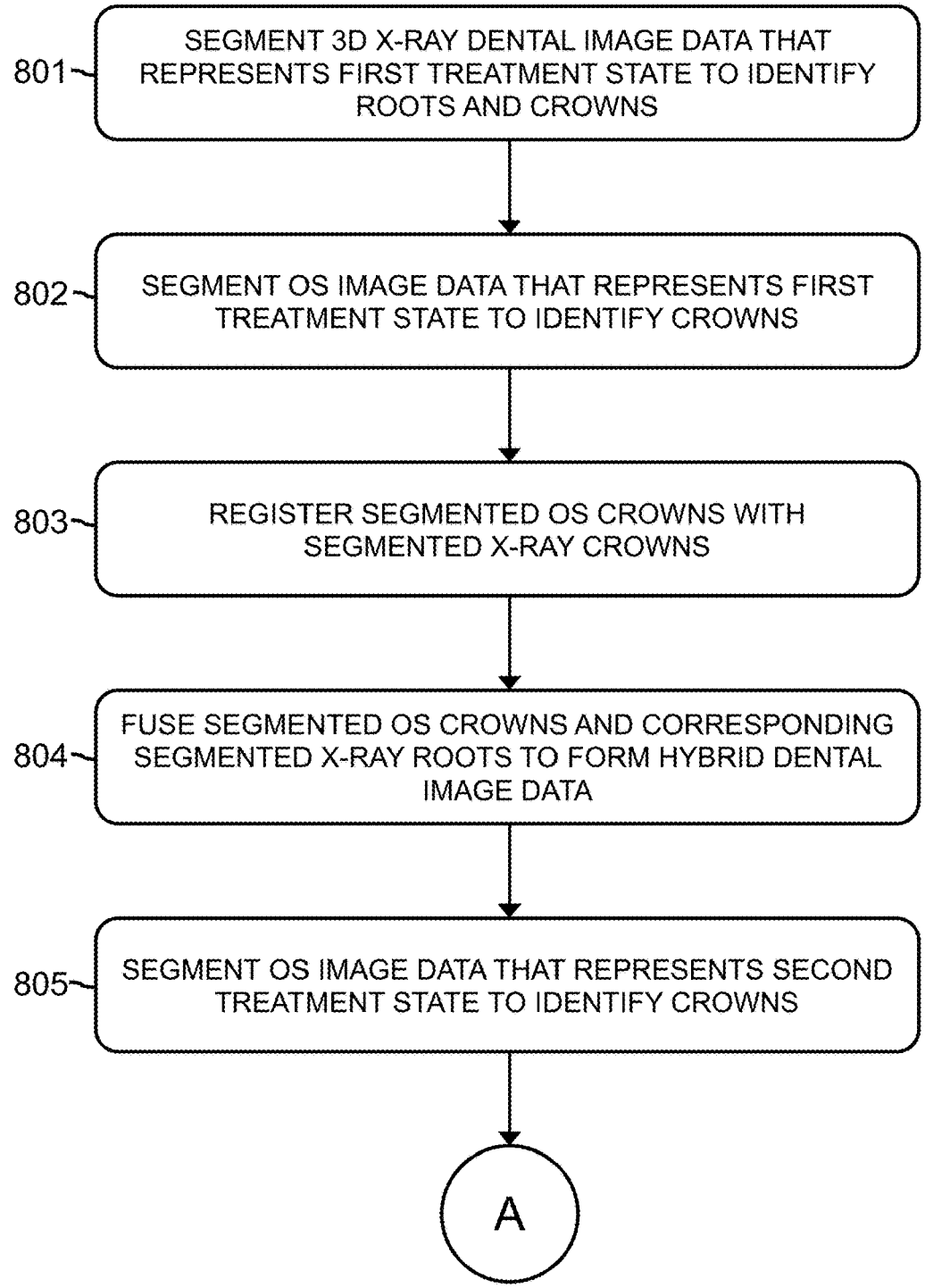
FIG. 8 is a flow chart of a computer-implemented method for monitoring teeth position during treatment, according to another embodiment.
Figure 8:
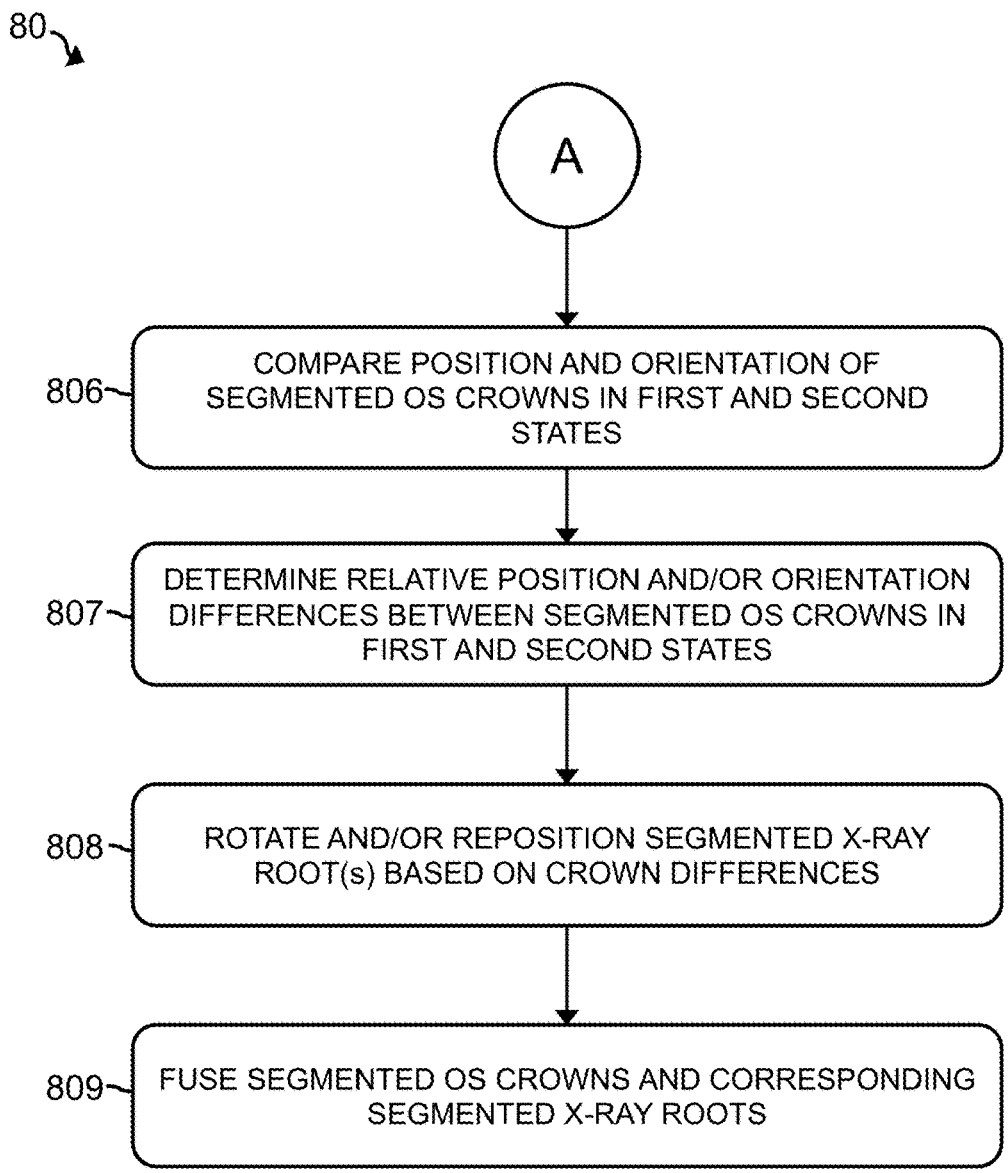

FIG. 8 is a flow chart of a computer-implemented method 80 for monitoring teeth position during treatment, according to another embodiment.

In step 801, the computer segments 3D X-ray dental image data that represents a first treatment state of a patient to produce segmented X-ray crowns and segmented X-ray roots. Step 801 is the same as step 101.

In step 802, the computer segments first OS dental image data that represents the first treatment state of the patient to produce first OS segmented crowns. Step 802 can be performed in the same manner as step 102. For example, step 802 can be performed using machine learning and/or CNNs.

The computer can receive the first OS dental image data from computer memory that is accessible to the computer. Additionally or alternatively, the computer can receive the first OS dental image data from a dental optical scanner such as an intra-oral scanner or from an optical scan of a mold, physical model, or impression of one or more teeth, which can be scanned on a benchtop, in a lab, or with another machine or in another facility.

In step 803, the computer registers and/or aligns the segmented X-ray crowns with the respective first segmented OS crowns. The segmented X-ray crowns and the first segmented OS crowns can be registered and/or aligned using machine learning and/or CNNs, for example as disclosed in U.S. Patent Application Publication No. 2020/0175678.

In step 804, the computer fuses, meshes, or combines the segmented X-ray roots and the first segmented OS crowns to form first fused teeth with first hybrid dental image data. The segmented X-ray crowns are not included in the hybrid dental image data. The segmented X-ray roots and the first segmented OS crowns can be fused, meshed, or combined using machine learning and/or CNNs.

Figure 9:
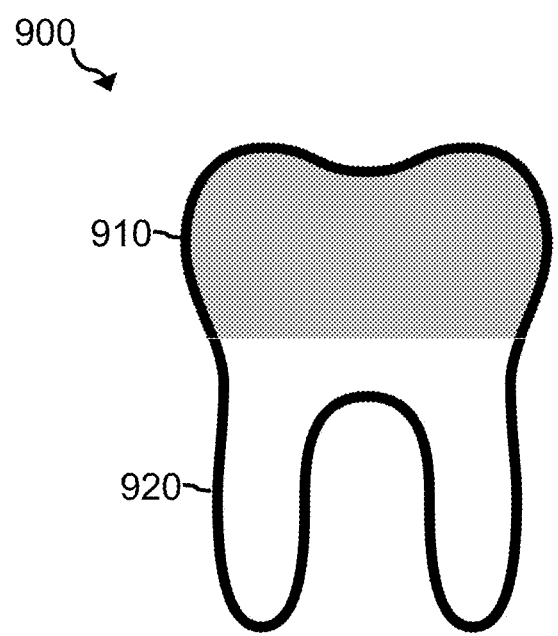
FIG. 9 is a simplified example of a fused tooth in the first treatment state according to an embodiment.

FIG. 9 is a simplified example of a fused tooth 900 in the first treatment state according to an embodiment. The fused tooth 900 includes a first segmented OS crown 910 from the first OS dental image data and a segmented X-ray root 920 from the 3D X-ray dental mage data. The first segmented OS crown 910 and the segmented X-ray root 920 are in the first treatment state.

In step 805, the computer segments second OS dental image data that represents the second treatment state of the patient to produce second segmented OS crowns. Step 805 is the same as step 102.

In step 806 (via placeholder A), the computer compares the position and orientation of each segmented X-ray crown and the corresponding/respective segmented OS crown for each tooth. Step 806 can be performed in the same or similar manner as step 103. For example, step 806 can be performed using machine learning and/or CNNs.

In step 807, the computer determines, for each tooth, any differences in the relative position and the relative orientation of the first and second segmented OS crowns in the first and second treatment states, respectively. Step 807 can be performed in the same or similar manner as step 104. For example, step 807 can be performed using machine learning and/or CNNs.

Figure 10:
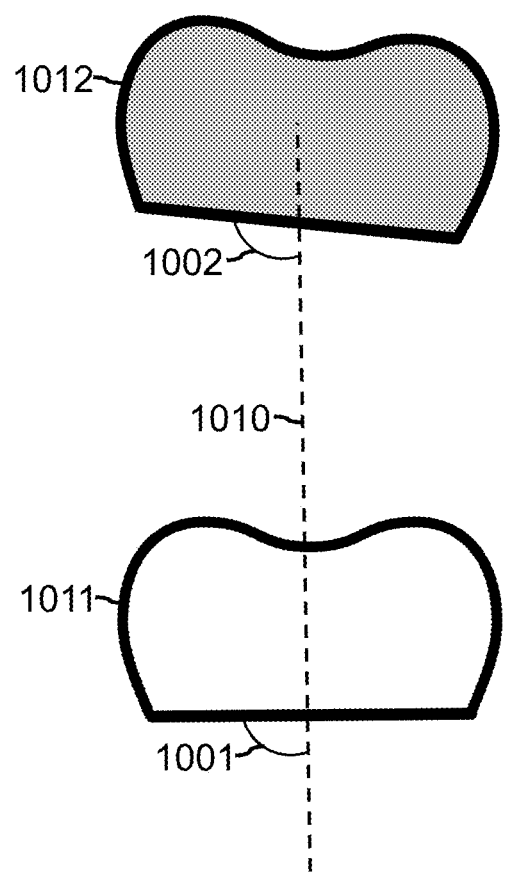
FIG. 10 illustrates an example of a relative orientation difference between segmented crown images of the same tooth in the first and second treatment states according to an embodiment.

FIG. 10 illustrates an example of a relative orientation difference between segmented crown images of the same tooth in the first and second treatment states. The first segmented OS crown 1011, in the first treatment state, is oriented at a first angle 1001 with respect to axis 1010. The second segmented OS crown 1012, in the second treatment state, is oriented at a second angle 1002 with respect to axis 1010. The second angle 1002 is different (e.g., larger) than the first angle 1001, indicating an orientation difference. The difference in the first and second angles 1001, 1002 indicates that the second segmented OS crown 1012 is pivoted clockwise with respect to axis 1010 compared to the first segmented OS crown 1011.

In step 808, for each tooth in which a difference in orientation and/or position of the first and second segmented OS crowns is determined between the first and second treatment states, respectively, in step 807, the computer makes a corresponding change in the position and/or orientation of the corresponding segmented X-ray root from the 3D X-ray dental image data in the first treatment state. For example, if the second segmented OS crown, in the second treatment state, is pivoted or rotated by 2 degrees with respect to an axis in a given plane, compared to the first segmented OS crown, in the first treatment state, of the same tooth, the computer rotates or pivots the corresponding segmented X-ray root (of the same tooth) by 2 degrees with respect to the same axis in the same plane (or with respect to a parallel axis in a parallel plane). Likewise, if the second segmented OS crown is moved laterally by 1 mm with respect to an axis compared to the first segmented OS crown of the same tooth, the corresponding segmented X-ray root of the same tooth will also be moved laterally by 1 mm with respect to the same or a parallel axis. The segmented X-ray root can be re-positioned and/or re-oriented using machine learning and/or CNNs. An example of this step is illustrated in FIG. 6.

Alternatively, the computer can change the position and/or orientation of each fused tooth, formed in step 804, according to the difference in orientation and/or position of the first and second segmented OS crowns of the same tooth.

In another embodiment, the computer can register and/or align each segmented X-ray crown in the 3D X-ray dental image data with the respective second segmented OS crown in the second OS dental image data. Aligning and/or registering the segmented crowns can cause the segmented X-ray roots in the 3D X-ray dental image data to be aligned with the second segmented OS crowns in the second OS dental image data. The segmented crowns in the 3D X-ray dental image data and in the OS dental image data can be registered and/or aligned using machine learning and/or CNNs.

Step 807 can be performed using machine learning and/or CNNs.

For each tooth in which the difference in the relative position and the relative orientation of the first and second segmented OS crowns is zero, as determined in step 807, the position and orientation of the corresponding segmented X-ray root are maintained in step 808. For example, when the position and orientation of the first segmented OS crown is the same as the position and orientation of the first respective second segmented OS crown, the position and orientation of the corresponding segmented X-ray root is not changed in step 807.

In step 809, the computer fuses, combines, and/or meshes the second segmented OS crowns and the segmented X-ray roots for corresponding teeth to form second fused teeth with second hybrid dental image data. Any segmented X-ray roots that were re-positioned and/or re-oriented in step 808 are fused in the re-positioned and/or re-oriented state. The second fused teeth can simulate the position and orientation of the roots in the patients' dentition over the course of treatment (e.g., over time) without having to expose the patient to additional radiation and without incurring the expense of additional 3D X-ray (e.g., CBCT) scans. This is a significant technical advantage over existing treatment methods that rely on performing 3D X-rays scans throughout treatment. Step 809 can be performed in the same manner as step 106 and/or step 804. For example, the segmented X-ray roots and the second segmented OS crowns can be fused, meshed, or combined using machine learning and/or CNNs.

The fused teeth can be displayed on a display screen coupled to the computer.

Figure 11:
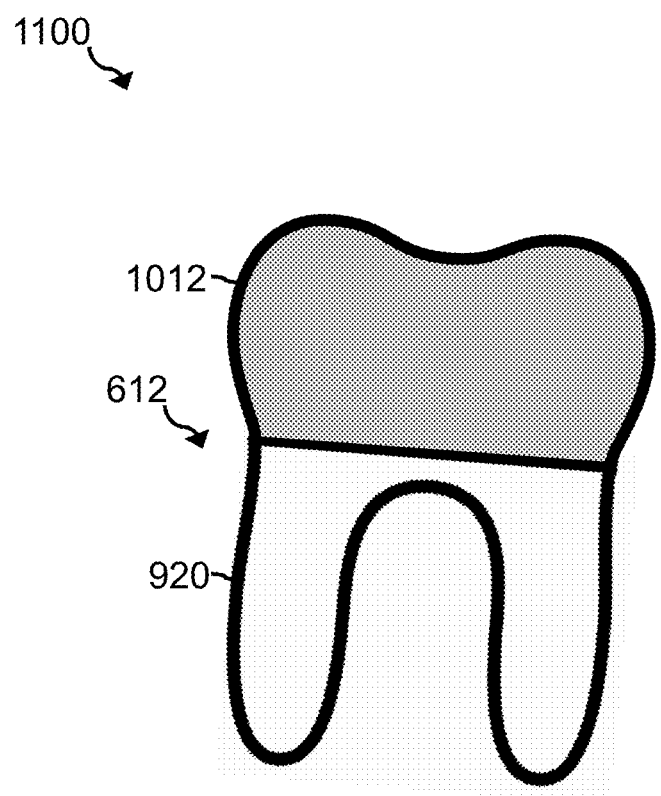
FIG. 11 illustrates an example a fused tooth in the second treatment state according to an embodiment.

FIG. 11 illustrates an example of a fused tooth 1100 according to an embodiment. The fused tooth 1100 includes the segmented X-ray root 920, from the 3D X-ray image data, in a simulated second treatment state, and the second segmented OS crown 1012, from the second OS image data, in the second treatment state. The simulated second treatment state is the same as or similar to the simulated second treatment state 612. The segmented X-ray root 920 simulates the position and orientation of the root in the second treatment state.

Figure 12:
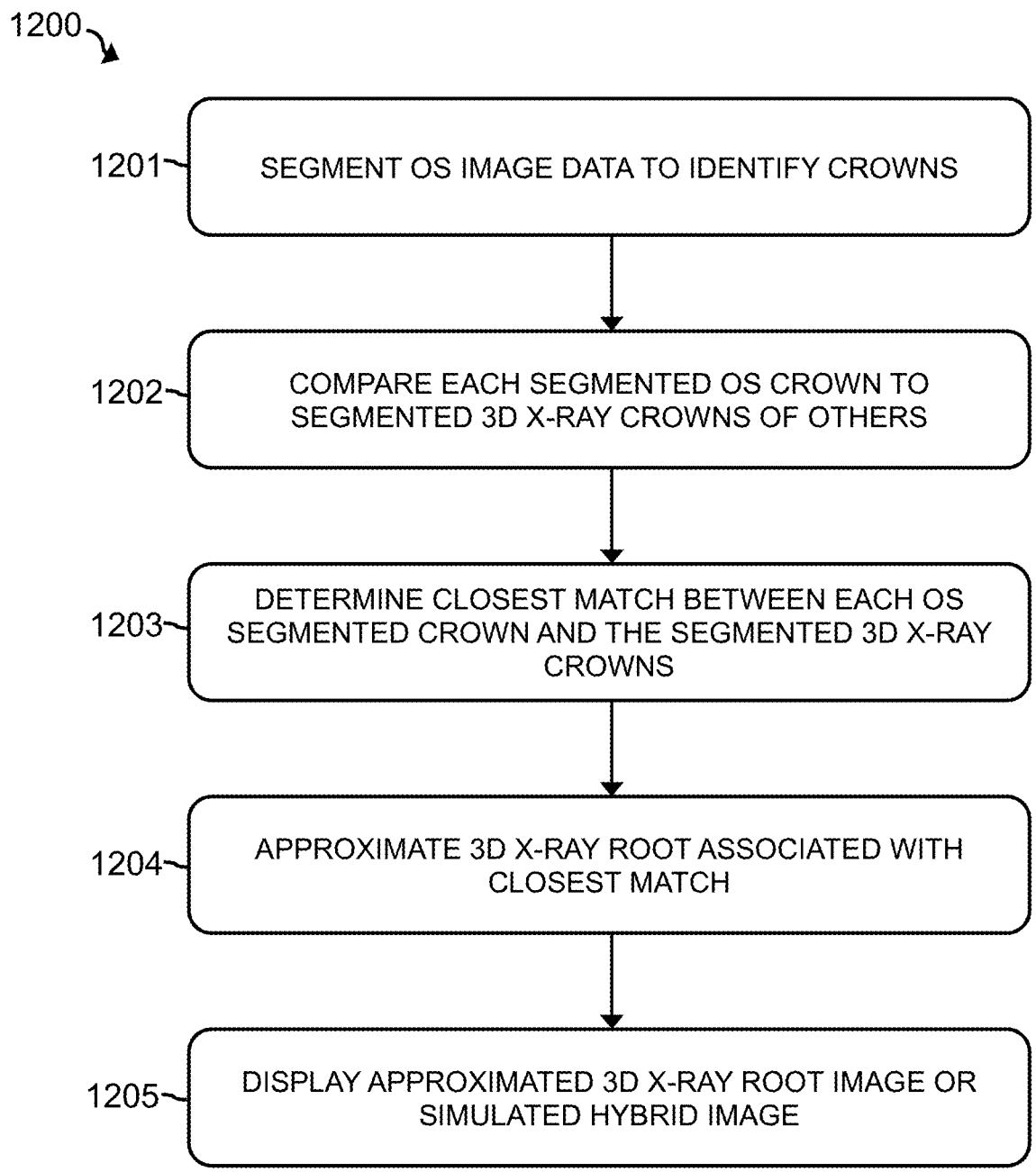
FIG. 12 is a flow chart of a computer-implemented method for generating an approximate image of a dental root, according to an embodiment.

FIG. 12 is a flow chart of a computer-implemented method 1200 for generating an approximate image of a dental root using machine learning, according to an embodiment.

Figure 13:
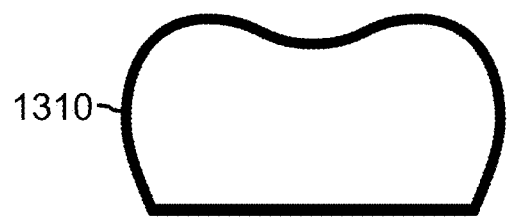
FIG. 13 is a simplified example of a segmented OS crown according to an embodiment.

In step 1201, the computer segments OS dental image data to produce OS segmented crowns. Step 1201 can be performed in the same manner as step 102, step 802, and/or step 805. For example, the OS dental image data can be segmented using machine learning and/or CNNs. A simplified example of a segmented OS crown 1310 is illustrated in FIG. 13.

In step 1202, the computer compares each segmented OS crown from the OS dental image data to segmented 3D X-ray crowns from pre-existing 3D X-rays (e.g., CBCT scans) of other subjects. The segmented 3D X-ray crowns can represent hundreds, thousands, or tens of thousands of subjects, which can be stored in memory operably coupled to the computer. The memory can be on a server, which can be remote from (e.g., cloud-based) or local to the computer. The memory can be distributed across multiple servers.

The computer can compare the segmented OS crowns and the segmented 3D X-ray crowns using artificial intelligence, machine learning, and/or CNNs.

In step 1203, the computer determines the closest match between each segmented OS crown and the segmented 3D X-ray crowns. The computer can determine the closest match using artificial intelligence, machine learning, and/or CNNs. In some embodiments, the computer can calculate a similarity metric between each segmented OS crown and the segmented CBCT crowns. Additionally or alternatively, the closest match can be determined using an iterative closest point (ICP) algorithm to minimize the difference between two clouds of points, for example where one of the clouds of points represents the segmented OS crown and the other cloud of points represents one of the segmented 3D X-ray crowns. The ICP algorithm can be repeated with respect to the segmented OS crown and each segmented 3D X-ray crown to determine the cloud of points that represents the segmented 3D X-ray crown that is closest to the cloud of points that represents the segmented OS crown for a given tooth.

Figure 14:
FIG. 14 is a simplified example of a 3D X-ray crown according to an embodiment.

A simplified example of a segmented 3D X-ray crown 1410 is illustrated in FIG. 14. Segmented 3D X-ray crown 1410 is the closest match to segmented OS crown 1310 (FIG. 13).

In step 1204, after the computer determines the closest match between a given OS crown and the segmented 3D X-ray crowns, the computer uses the respective segmented 3D X-ray root for each segmented 3D X-ray crown having the closest match (e.g., as determined in step 1203) as an approximate or simulated image of the root of the tooth for the OS crown.

In step 1205, the computer causes the approximate segmented 3D X-ray roots to be displayed on a display screen operatively coupled to the computer. Alternatively, the computer can fuse, mesh, or combine each OS crown with the respective approximate 3D X-ray root to form a simulated hybrid image of the patient's teeth, which can be displayed in this step. The fusing of the OS crowns and the 3D X-ray roots can be performed in the same manner as in steps 106, 804, and/or 809. Each OS crown and the respective segmented 3D X-ray crown can be aligned and/or registered prior to forming the simulated hybrid image. Aligning and/or registering the OS crown and the respective segmented 3D X-ray crown can cause the OS crown and the respective approximate 3D X-ray root to be aligned and/or registered.

The approximate 3D X-ray roots simulate the position and orientation of the roots in the patients' dentition without having to expose the patient to radiation and without incurring the expense of performing 3D X-ray scans. This is a significant technical advantage over existing treatment methods that rely on performing 3D X-rays scans to obtain these images.

Figure 15:
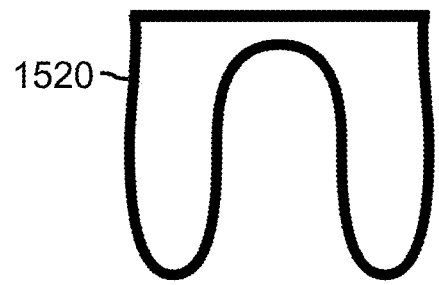
FIG. 15 is an example of an approximate 3D X-ray root according to an embodiment.
Figure 16:
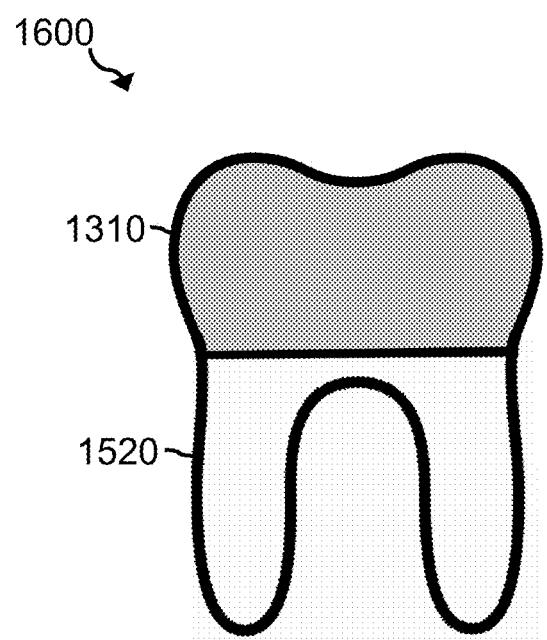
FIG. 16 is an example of a fused tooth according to an embodiment.

An example of an approximate 3D X-ray root 1520 is illustrated in FIG. 15. An example of a fused tooth 1600 is illustrated in FIG. 16. The fused tooth 1600 includes the segmented OS crown 1310 and the approximate 3D X-ray root 1520.

Figure 17:
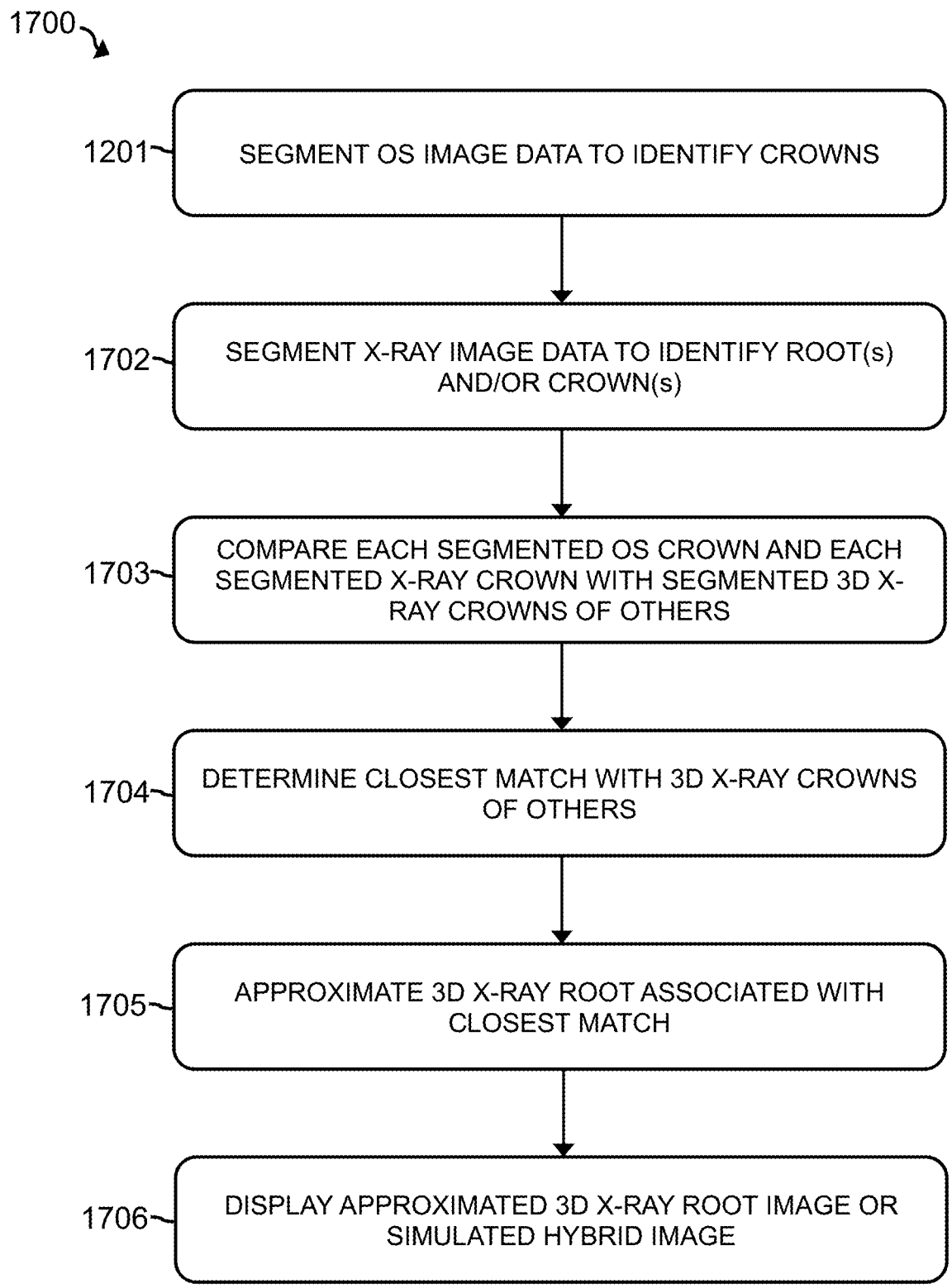
FIG. 17 is a flow chart of a computer-implemented method for generating an approximate image of a dental root using machine learning, according to another embodiment

FIG. 17 is a flow chart of a computer-implemented method 1700 for generating an approximate image of a dental root using machine learning, according to another embodiment.

Step 1201 in method 1700 is the same as described above in method 1200.

In step 1702, 2D X-ray dental image data from one or more 2D X-ray dental images are segmented to identify the root(s) and/or crown(s) to the extent they are viewable. The 2D X-ray dental images can include one or more panoramic X-rays, one or more bitewing X-rays, one or more periapical X-rays, and/or other two-dimensional X-ray image(s) of some or all of the patient's dentition. The 2D X-ray dental image(s) can be segmented using artificial intelligence, machine learning, and/or CNNs. Step 1702 can occur prior to or concurrently with step 1201.

In step 1703, the computer compares each segmented OS crown from the OS dental image data and any segmented 2D X-ray crowns for the same tooth to segmented 3D X-ray crowns from pre-existing 3D X-rays (e.g., CBCT scans) of other subjects/patients. The segmented 3D X-ray crowns can represent hundreds, thousands, or tens of thousands of subjects, which can be stored in memory operably coupled to the computer. The memory can be on a server, which can be remote from (e.g., cloud-based) or local to the computer. The memory can be distributed across multiple servers.

The computer can compare the segmented OS crowns, the segmented 2D X-ray crowns, and the segmented 3D X-ray crowns using artificial intelligence, machine learning, and/or CNNs.

In step 1704, the computer determines the closest match between (a) each segmented OS crown and any segmented 2D X-ray crowns for the same tooth and (b) the segmented 3D X-ray crowns. The computer can determine the closest match using artificial intelligence, machine learning, and/or CNNs. In some embodiments, the computer can calculate a similarity metric between (a) each segmented OS crown and any segmented X-ray crowns for the same tooth and (b) the segmented 3D X-ray crowns. Additionally or alternatively, the closest match can be determined using an ICP algorithm to minimize the difference between two clouds of points, for example where one of the clouds of points represents the segmented OS crown and the 2D X-ray crown for the same tooth and the other cloud of points represents one of the segmented 3D X-ray crowns. The ICP algorithm can be repeated with respect to (a) the segmented OS crown and the 2D X-ray crown for the same tooth and (b) each segmented 3D X-ray crown to determine the cloud of points that represents the segmented 3D X-ray crown that is closest to the cloud of points that represents the segmented OS crown and the 2D X-ray crown for a given tooth.

In some embodiments, the computer can determine multiple candidate matches in step 1704. The candidate matches can be segmented 3D X-ray crowns that have approximately the same similarity metric. The segmented 3D X-ray crown in each candidate match is associated with a corresponding 3D X-ray root.

In step 1705, after the computer determines the closest match in step 1704, the computer uses the respective segmented 3D X-ray root for each segmented 3D X-ray crown having the closest match (e.g., as determined in step 1704) as an approximate or simulated image of the root of the tooth for the OS crown.

When the 2D X-ray images include one or more segmented 2D X-ray roots, the computer can use the segmented 2D X-ray root(s) for the same tooth to select the segmented 3D X-ray root, from the 3D X-ray roots that are associated with (e.g., for the same teeth as) the segmented 3D X-ray crown candidate matches, that is the closest match to the segmented 2D X-ray root(s). The segmented 3D X-ray root having the closest match can be selected, for each tooth, by comparing the 2D X-ray root(s) and the corresponding 3D X-ray roots for the candidate matches.

In step 1706, the computer causes the approximate segmented 3D X-ray roots to be displayed on a display screen operatively coupled to the computer. Alternatively, the computer can fuse, mesh, or combine each OS crown with the respective approximate 3D X-ray root to form a simulated hybrid image of the patient's teeth, which can be displayed in this step. The fusing of the OS crowns and the 3D X-ray roots can be performed in the same manner as in steps 106, 804, 809, and/or 1205. Each OS crown and the respective segmented 3D X-ray crown can be aligned and/or registered prior to forming the simulated hybrid image. Aligning and/or registering the OS crown and the respective segmented 3D X-ray crown can cause the OS crown and the respective approximate 3D X-ray root to be aligned and/or registered.

The approximate 3D X-ray roots simulate the position and orientation of the roots in the patients' dentition without having to expose the patient to radiation and without incurring the expense of performing 3D X-ray scans. This is a significant technical advantage over existing treatment methods that rely on performing 3D X-rays scans to obtain these images.

In some embodiments, the computer can use the segmented OS crowns from the OS dental image data and the segmented 2D X-ray roots (e.g., from a panoramic X-ray image) to approximate and/or predict the 3D location and/or position of the patient's roots. The approximation and/or prediction can be made by comparing the segmented OS crowns and the segmented 2D X-ray roots with 3D X-ray images (e.g., segmented 3D X-ray crowns and/or segmented 3D X-ray roots) of the patient's teeth or of other patient's teeth to determine a best match (e.g., as discussed herein). Additionally or alternatively, the approximation and/or prediction can be made using machine learning and/or CNNs.

Figure 18:
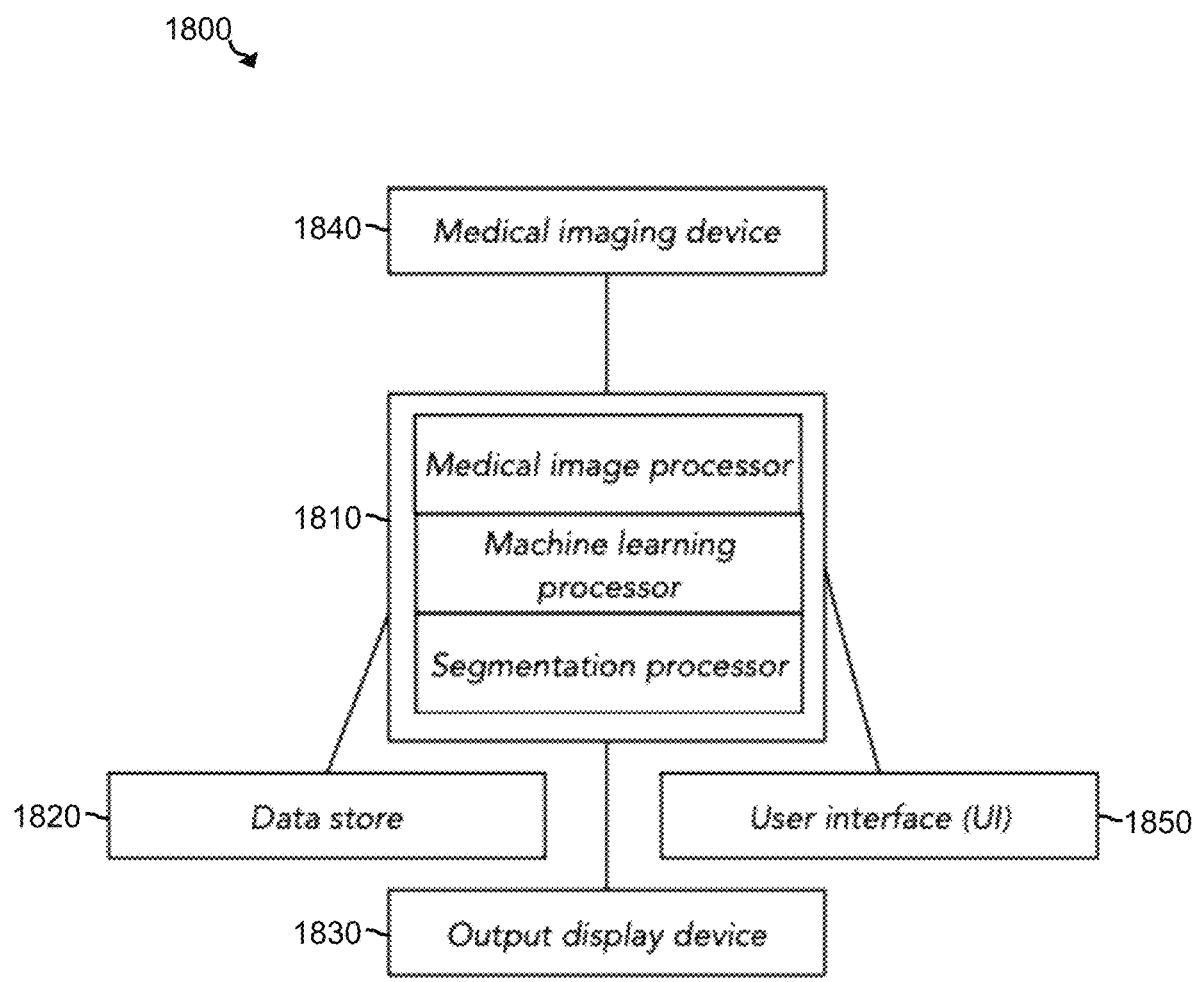
FIG. 18 is a block diagram of a system according to an embodiment.

FIG. 18 is a block diagram of a system 1800 according to an embodiment. The system 1800 can be used to perform the methods describe herein.

The system 1800 includes a computer 1810, a data store 1820, an output display 1830, and one or more optional medical imaging devices 1840. The computer 1810 includes one or more processing circuits which can be implemented on one or more microprocessors. The processing circuits can include a medical image processor, a machine learning processor, and/or a segmentation processor. The processing circuits can be separately implemented in separate integrated circuit (IC) wafers or chips. Alternatively, the processing circuits can be implemented in shared circuitry on the same IC wafer or chip, and may include elements of a central processing unit, graphical processing unit, and/or independent circuits altogether.

The computer 1810 is operatively coupled to the data store 1820, which can be local or remote from the computer 1810. The data store 1820 can store computer-readable instructions for performing the methods described herein. The data store 1820 can also store dental image data and/or segmented image data (e.g., segmented crowns and segmented roots).

The output display device 1830 includes a display screen, such as a monitor or built-in display, to display dental images. The computer 1810 can cause dental images to be displayed such as segmented images, fused teeth images, and/or simulated teeth images. The output display device 1830 can also display a user interface 1850 (e.g., a graphical user interface) that allows the user to control operation of the computer 1810.

The optional medical imaging device(s) 1840 can include a dental X-ray machine, a CBCT machine, a dental optical scanner (e.g., an IOS), and/or another dental imaging device. The medical imaging device(s) 1840 can be operatively coupled to the computer 1810 to provide dental image data thereto. The computer 1810 can store the dental image data in the data store 1820, as discussed above.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The invention claimed is:

1. A computer-implemented method for monitoring teeth position during treatment, comprising:
   (a) segmenting three-dimensional dental X-ray image data of teeth in a first treatment state to produce segmented X-ray crowns and segmented X-ray roots, each segmented X-ray crown associated with a respective segmented X-ray root;
   (b) segmenting optical-scan (OS) image data of the teeth in a second treatment state to produce segmented OS crowns;
   (c) comparing, for each tooth, a position and an orientation of each segmented X-ray crown with a position and an orientation of a respective segmented OS crown;
   (d) determining, for each tooth, any relative position differences and any relative orientation differences of each segmented X-ray crown relative to the respective segmented OS crown;
   (e) for each tooth in which at least one of a relative position difference or a relative orientation difference of a corresponding segmented X-ray crown is determined in step (d), changing at least one of a position or an orientation of the respective segmented X-ray root according to the relative position difference or the relative orientation difference of the corresponding segmented X-ray crown;
   (f) for each tooth in which the corresponding segmented X-ray crown has the same relative position and the same relative orientation relative to the respective segmented OS crown, maintaining the position and the orientation of the respective segmented X-ray root.

2. The method of claim 1, wherein the three-dimensional dental X-ray image data comprise cone-beam computer tomography data.

3. The method of claim 1, wherein:
   the OS segmented crowns are second segmented OS crowns,
   the OS image data are first OS image data,
   the hybrid image data are second hybrid image data, and
   the method further comprises:
      (h) segmenting first OS image data of the dentition in the first treatment state to produce first segmented OS crowns;
      (i) registering, for each tooth, each segmented X-ray crown with a respective first segmented OS crown; and
      (j) after step (i), fusing each first segmented OS crown with the corresponding segmented X-ray root to form first hybrid image data that simulates the roots of the teeth in the first treatment state.

4. The method of claim 1, wherein the OS image data comprise intra-oral scan image data.

5. The method of claim 1, wherein the OS image data represent an optical scan of a mechanical mold of the dentition.

6. The method of claim 1, further comprising graphically indicating each difference determined in step (d).

7. The method of claim 1, further comprising displaying, on a display screen coupled to the computer, fused teeth using the hybrid image data.

8. The method of claim 1, further comprising: (g) fusing, for each tooth, the segmented OS crown from step (b) with the corresponding segmented X-ray root whose position and orientation were determined in step (e) or maintained in step (f) to form hybrid image data that simulates the roots of the teeth in the second treatment state.

* * * * *